United States Patent [19]

Melen

[11] Patent Number: 5,912,996
[45] Date of Patent: Jun. 15, 1999

[54] METHOD OF ENHANCING THE SIGNAL-TO-NOISE WITHIN THE PIXEL IMAGE OF A HAND ENTERED SYMBOL

[75] Inventor: Roger D. Melen, Los Altos Hills, Calif.

[73] Assignee: Canon Kabushiki Kaisha, Tokyo, Japan

[21] Appl. No.: 08/813,831

[22] Filed: Mar. 6, 1997

[51] Int. Cl.$^6$ .............................. G06K 9/20; G06K 9/34; G06K 9/46; H04N 1/00

[52] U.S. Cl. .......................... 382/317; 382/177; 382/179; 382/181; 382/182; 382/187; 382/202; 382/312

[58] Field of Search .................................... 382/177, 181, 382/179, 182, 187, 202, 312, 317; 358/403, 442, 443, 464

[56] References Cited

U.S. PATENT DOCUMENTS

| | | | |
|---|---|---|---|
| 4,559,644 | 12/1985 | Kataoka et al. | 382/254 |
| 4,872,062 | 10/1989 | Nanba | 358/443 |
| 4,893,333 | 1/1990 | Baran et al. | 358/403 |
| 4,926,490 | 5/1990 | Mano | 382/177 |
| 5,113,452 | 5/1992 | Chatani et al. | 382/187 |
| 5,247,591 | 9/1993 | Baran | 382/179 |
| 5,307,423 | 4/1994 | Gupta et al. | 382/182 |
| 5,487,118 | 1/1996 | Melen | 382/202 |

*Primary Examiner*—Bipin Shalwala
*Assistant Examiner*—Daniel G. Mariam
*Attorney, Agent, or Firm*—Paul Hentzel

[57] ABSTRACT

An input carrier sheet 12C for document distribution system 10 carries input symbols hand entered by the user into pre-existing constraint grids 12. The constraint grids may be printed in continuous tone or halftone. The print only partially covers the underlying carrier, permitting the exposed carrier to reflect light. The grids have sufficient pigment to be visible to the user, but insufficient pigment to form foreground pixels along with the hand-entered stroke when detected during the scanning. The signal (symbol)-to-noise (carrier) ratio is enhanced by reducing the pigment content of the constraint grids which increases the reflectivity of the grids. The S/N may be further enhanced by placing the strokes of the hand-entered symbols on top of the grid which occults some of the grid pigment. The S/N is further enhanced by highly reflective brightening agents in the grid print, and by aperture effect during scanning.

34 Claims, 7 Drawing Sheets

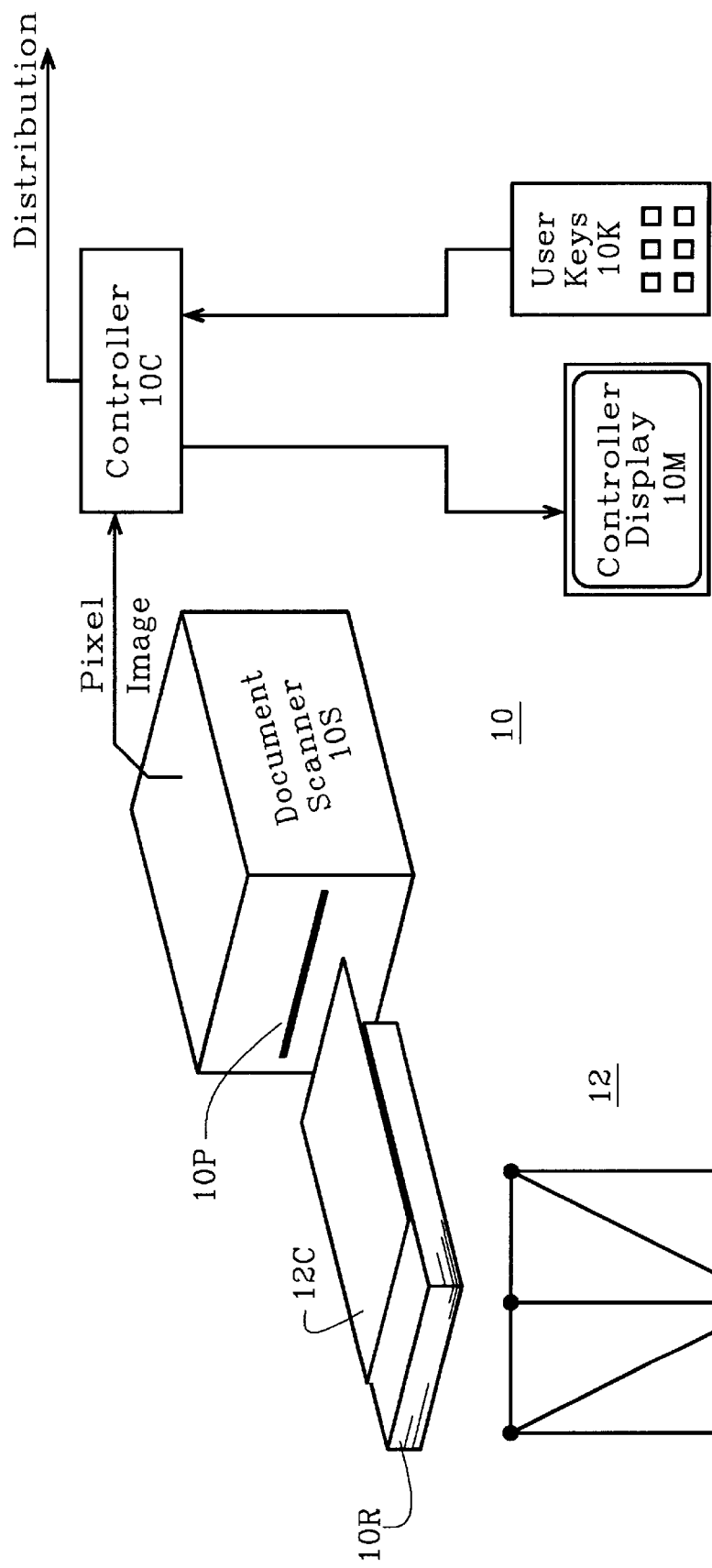

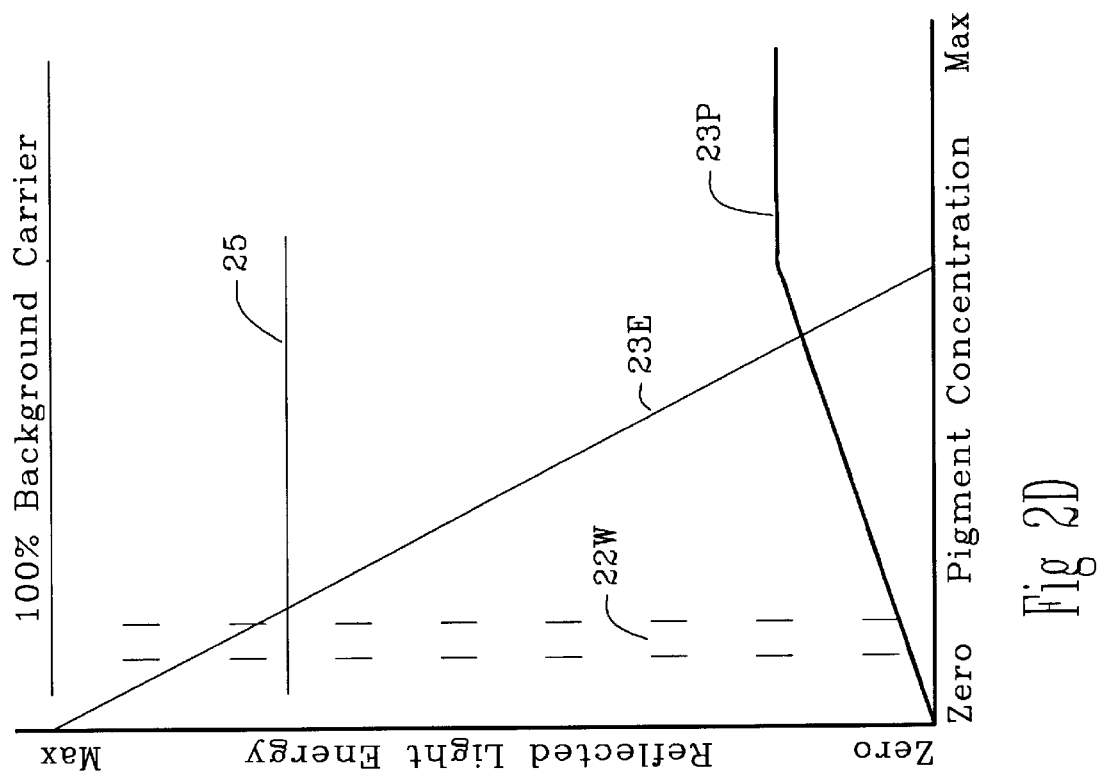
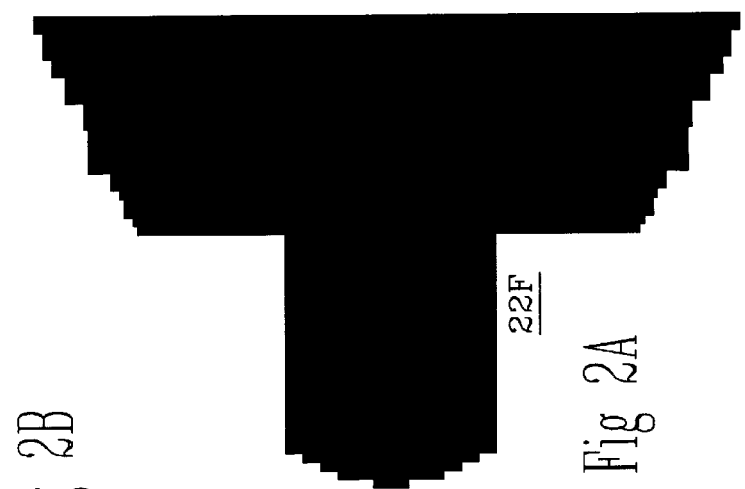
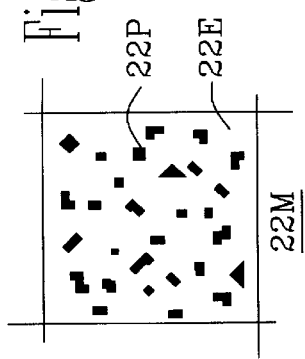
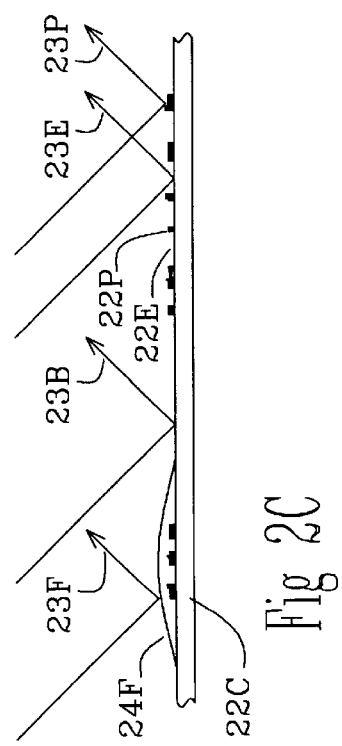

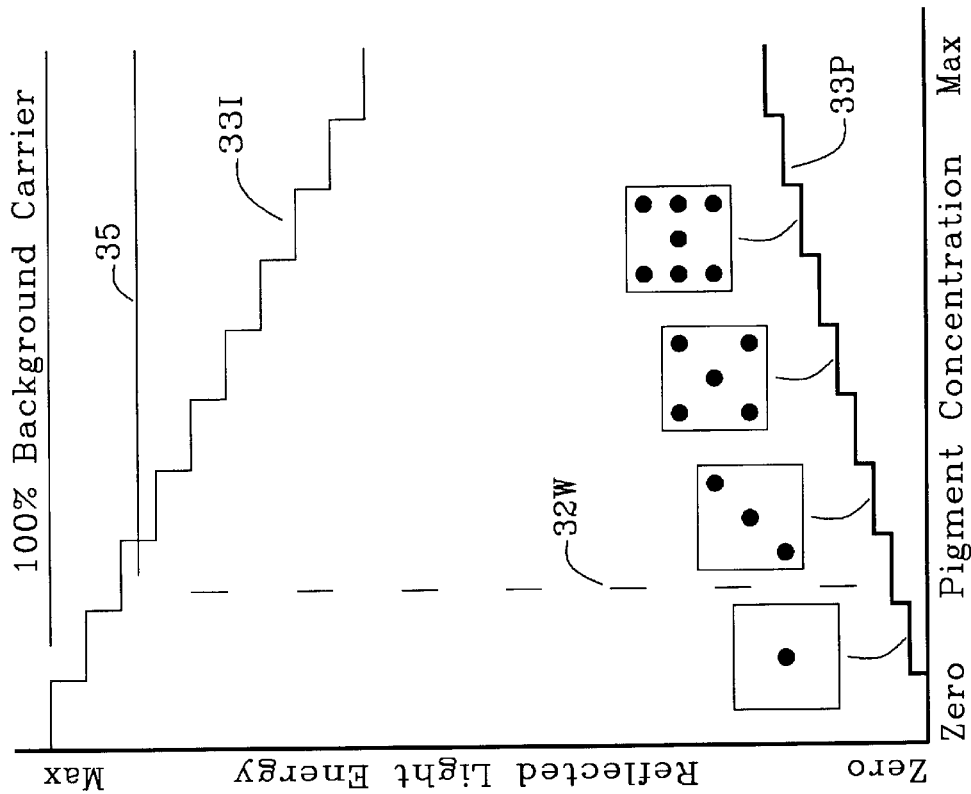
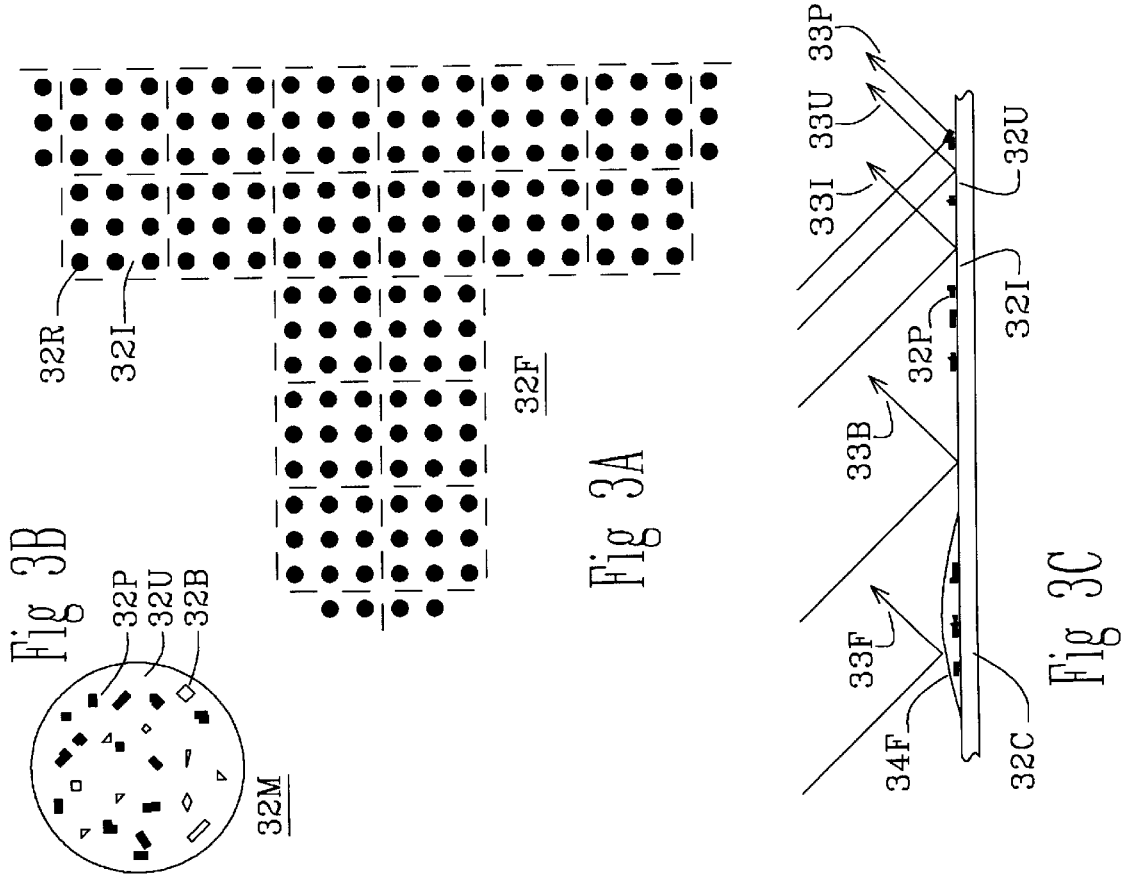

Providing an Input Carrier Sheet
   with Hand-Entry Constraint Grids
   Printed Thereon

Entering Strokes
   of the Hand-Entered Symbols
   into the Constraint Grids

Illuminating the Input Image
   Carried on the Input Carrier

Scanning the Input Image
   with an Array of Photo-Detectors

Defocusing the Components
   of Reflected Light Energy

Storing the Pixel Image
   of the Input Image

Retrieving the Stored Pixel Image

Filtering the Background Feature
   about a Threshold Between
   the Symbol Foreground and
   the Grid Background

Classifying the Foreground Pixel
   Image of the Hand-Entered Symbol
   by OCR Processing

Fig 7

METHOD OF ENHANCING THE SIGNAL-TO-NOISE WITHIN THE PIXEL IMAGE OF A HAND ENTERED SYMBOL

TECHNICAL FIELD

This invention relates to increasing the foreground (signal) to background (noise) within the pixel image of a hand-entered symbols for OCR classification, and more particularly to minimize the noise effect of hand-entry constraint grids which receive the entry.

BACKGROUND

Heretofore hand-entry constraint grids have been employed to receive hand entries for OCR classification. User visibility and photo-detection of constraint grids (and other guide artifacts) were optimized by spectrum management. That is, the color of the guide lines was selected to be visible to the user in ambient light, and to match (or mismatch) the detector response spectrum under detector illumination. For example, in xerography, light blue guide lines present on the original document do not appear on the copy. The silicon photo-detector layer on the charge transfer drum is responsive to blue light. The guide line image discharges the drum surface, and becomes indistinguishable from the white background of the document which also discharges the drum. In contrast, the silicon drum is not responsive to the dark text foreground on the document. The text retains the drum charge to form a charge image which is transferred to the copy for toning into a visible image. In silicon drum xerography, red lines do not discharge the drum, and appear in the toned image with the text foreground. application Ser. No. 08/567,763, filed on Dec. 5, 1995 by Radovan V. Krtolica and Roger D. Melen, and assigned to the present assignee; teaches a scanning system which employs spectrum management to delete hand-entry constraint grids. The input sheet contains constraint grids which do not appear in the output pixel image. The constraint grids are printed in a distinct color visible to the user, but not detectable by the scanner photo-detectors.

Other constraint grids, such as pair of parentheses "( )", provide left-right guides for receiving a dark vertical mark therebetween indicating a user selection. These parentheses type constraint grids are located on the original close to the entry mark, and are scanned by the photo-detectors. Reflected light from the grids may introduce noise into the output pixel image, unless they have a reflection wavelength sufficiently remote from the response portion of the detector spectrum.

SUMMARY

It is therefore an object of this invention to provide a method of enhancing the signal-to-noise ratio within an output pixel image created from scanning a hand-entered symbol.

It is another object of this invention to provide such a method which enhances the signal-to-noise by minimizing the noise effect of constraint grids.

It is a further object of this invention to provide such a method which enhances the signal-to-noise by merging the pixel image of the constraint grids into the pixel image of the carrier background.

It is a further object of this invention to provide such a method which enhances the signal-to-noise by employing grids having minimal light absorption.

It is a further object of this invention to provide such a method which enhances the signal-to-noise ratio by employing constraint grids having minimal pigment density.

It is a further object of this invention to provide such a method of signal-to-noise enhancement by employing constraint grids having minimal light reflecting area.

It is a further object of this invention to provide such a method which enhances the signal-to-noise ratio by employing constraint grids having maximal reflected light energy.

It is a further object of this invention to provide such a method which enhances the signal-to-noise ratio by occulting a portion of the constraint grid with the pigment of the hand entry.

It is a further object of this invention to provide such a method which enhances the signal-to-noise ratio by employing halftone grids.

It is a further object of this invention to provide such a method which provides halftone constraint grids having various grid pigment densities from a single printing ink source.

It is a further object of this invention to provide such a method which enhances the signal-to-noise ratio while maintaining the transition ground feature of the pixel image.

Briefly, these and other objects of the present invention are accomplished by providing a method of enhancing the signal-to-noise ratio between the foreground and background in a pixel image of a user hand entry, to facilitate OCR processing of the pixel image. An input carrier is provided having a wide reflection spectrum which establishes a carrier background feature of an input image. Hand-entry constraint grids are printed thereon for receiving the strokes of the user hand entry. The constraint grids establish a grid background feature of the input image. The constraint grids are printed in a grid pigment having a narrow reflection spectrum which is visible to the user as a distinct color against the carrier background feature for defining the sites of the constraint grids to the user. The strokes of the input symbols are hand entered into the constraint grids in a symbol pigment having a wide absorption spectrum. The symbol pigment establishes a symbol foreground feature of the input image against the background features. The input image carried on the input carrier is illuminated with a wide spectrum light source to provide components of reflected light energy including

- a symbol foreground component having minimal light energy reflected from the symbol foreground feature of the input image,
- a carrier background component having maximal light energy reflected from the carrier background feature of the input image, and
- a grid background component having maximal light energy reflected from the grid background feature of the input image.

The illuminated input image is scanned with an array of bulk conductive photo-detectors having a wide response spectrum. The photo-detectors capture light energy reflected from the input image to provide a pixel image of the input image. The bulk conductivity of each detector varies during the formation of each pixel in response to the total energy of the captured reflected light. The pixel image formed has background pixels caused by the maximal energy of the carrier background component plus the grid background component. In addition, the pixel image has foreground pixels caused by the minimal energy to the symbol foreground component. The grid background component of reflected light energy further has

- a pigment sub-component of minimal light energy reflected from particles of grid pigment within the grid sites, and a carrier sub-component of maximal light energy reflected from that portion of the input carrier included within the grid sites.

The grids have sufficient pigment to be visible to the user, but insufficient pigment to form foreground pixels when detected by the photo-detectors during the scanning step. The grid carrier sub-component has too much reflected light energy to form foreground pixels when detected by the photo-detectors during the scanning step, but sufficient light energy to form background pixels when detected by the photo-detectors during the scanning step. The entire grid background feature is therefore detected as background pixels along with the carrier background feature enhancing the signal-to-noise ratio of the pixel foreground to the pixel background. The foreground pixel image of the hand-entered input symbol is classified by OCR processing.

BRIEF DESCRIPTION OF THE DRAWING

Further objects and advantages of the present invention, and the method of enhancing the signal-to-noise will become apparent from the following detailed description and drawing (not drawn to scale) in which:

FIG. 1A is a block diagram of data distribution system 10 showing a document scanner for receiving the input carrier sheet containing the input image;

FIG. 1B is a diagram of a guide constraint employed on the input carrier sheet of FIG. 1A;

FIG. 2A shows a continuous tone fragment of the constraint grid of FIG. 1B;

FIG. 2B is an magnified section of the fragment of FIG. 2A showing pigment particles;

FIG. 2C shows the components of reflected light from the continuous tone constraint grid fragment of FIG. 2A;

FIG. 2D shows response curves of the reflected light energy against the amount of pigment in the continuous tone constraint grid of FIG. 2A;

FIG. 3A shows a halftone fragment of the constraint grid of FIG. 1B;

FIG. 3B is an magnified pigment region of the fragment of FIG. 3A showing pigment particles;

FIG. 3C shows the components of reflected light from the halftone constraint grid fragment of FIG. 3A;

FIG. 3D shows response curves of the reflected light energy against the amount of pigment in the halftone constraint grid of FIG. 3A;

FIG. 7 is a flow chart showing the steps of the method of scanning and classifying the hand entries using system 10 of FIG. 1A.

Figure 4:
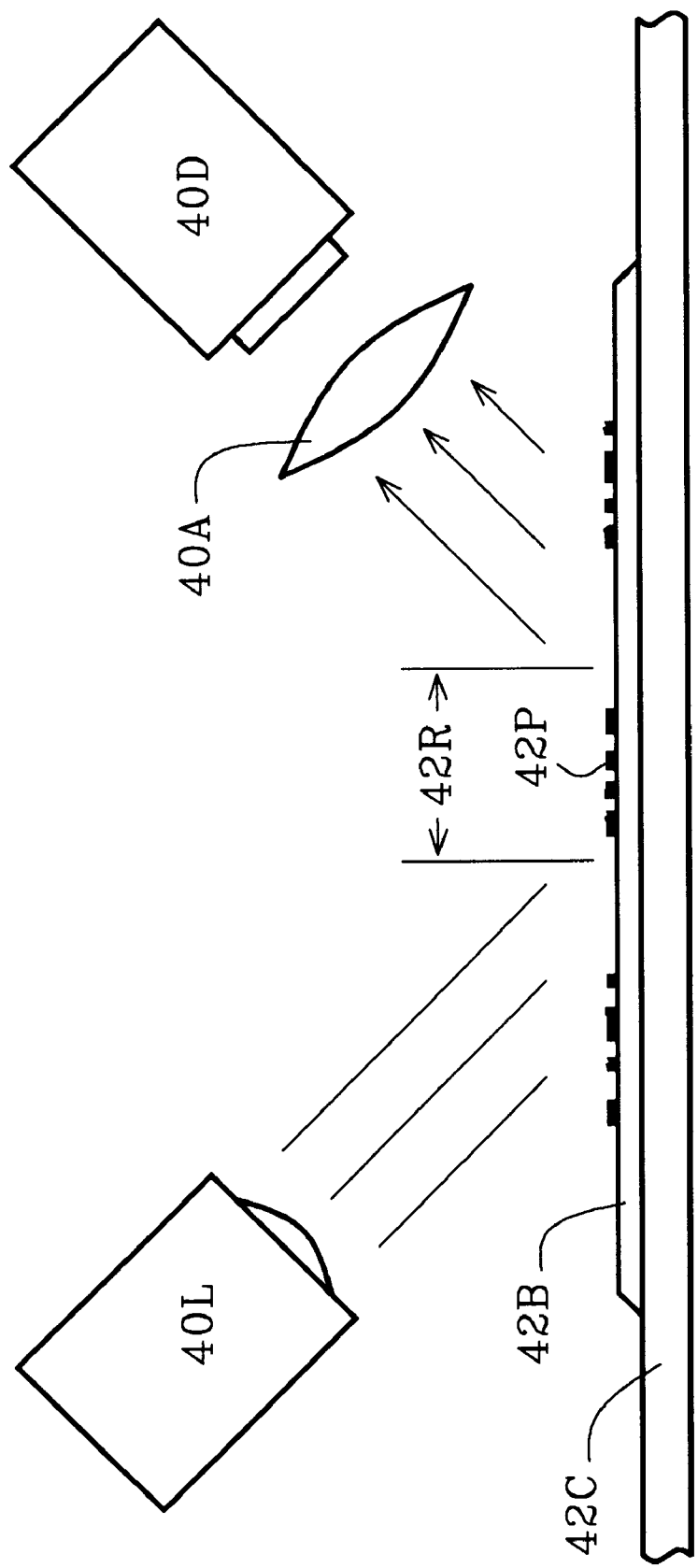
FIG. 4 is a simplified diagram of a constraint grid during scanning showing a light source and a photo-diode.

The first digit of each reference numeral in the above figures indicates the figure in which that element is most prominently shown. The second digit indicates related structural elements, and the final letter indicates a sub-portion of an element.

GENERAL SYSTEM—(FIG. 1A)

Document distribution system 10 receives user record documents 10R containing record data for distribution and storage. Controller 10C controls the operation of the document distribution system. A input carrier sheet 12C carrying an input image of hand-entered symbols accompanies each record document for directing the distribution. The input symbols are hand entered by the user in a stroke pigment (preferably black or very dark) forming a foreground feature of the input image. The foreground feature is highly visible against a contrasting carrier background feature formed by the input sheet (preferably white or very light). The carrier sheets and record documents may be ordinary paper or any other medium capable of retaining hand entered marks and print.

Document scanner 10S has a document port 10P for receiving the carrier sheets and user documents, and an array of suitable photo-sensitive devices such as detector 40D (see FIG. 4) for detecting the foreground and background features of the input image. A scanner light source 40L (see FIG. 4) illuminates the input image to provide reflected light energy to the photo-detectors. The document scanner is responsive to the controller for scanning the hand-entered symbols on the carrier sheet and the record data on the documents. The scanner provides an electronic output pixel image of the hand-entered symbols and record data. The format of the pixel image is determined by the linear density of the photo-detectors within the scanner array, the scanner clock speed, and the scanning advance rate established by relative motion between the carrier sheet and the array.

A controller display such as monitor 10M is responsive to the controller for displaying operational information about distribution system 10 to the user. A user response device such as keyboard 10K is connected to the controller for permitting the user to initiate and operate system 10.

CONSTRAINT GRIDS—(FIG. 1B)

The input symbols are hand entered by the user into pre-existing constraint grids 12 printed on input sheet 12C at predetermined grid sites. The grid pigment forms a grid background feature of the input image. The pigment is visible to the user and defines the location and extent of the sites occupied by the constraint grids. The constraint grids present symbol frames to the user for guiding the hand entry of the input symbols. The constraint grids determine the position and length and direction of each stroke forming the input symbol. Machine printed input symbols entered by printing devices such as typewriters and laser printers, have a defined font with a fixed position, and do not require constraint grids.

The constraint grid may have any suitable configuration such as the star embodiment (shown in FIG. 1B). The star embodiment has sixteen stroke guides (shown as line segments) and nine stroke endpoints or nodes (shown as dots) suitable for alpha-numerics. Each stroke connects two endpoints. Stroke marks drawn in by the user must be placed over or proximate a stroke guide of the constraint grid in order to be processed as a stroke. The sixteen stroke guides of the star embodiment define sixteen corresponding strokes of a finite set of symbol stroke patterns having two to the 16th (65,536) stroke patterns. The stroke patterns are stored in a library, and used during the classification of the hand-entered symbols (see FIG. 7). Other guide constraint formats may be employed to provide a different selection of stroke patterns.

CONTINUOUS TONE GRID—(FIG. 2A 2B 2C)

Constraint grids 12 of the background feature may be formed by pigment particles printed in continuous tone within the grid sites. The continuous tone process provides what appears to the naked eye as a solid pigment grid as illustrated by grid fragment 22F shown in FIG. 2A. Continuous tone grid fragment 22F depicts the small piece of constraint grid 12 proximate node 12N of FIG. 1B along the righthand side. An magnified view (shown in FIG. 2B) of a section 22M of fragment 22F reveals that individual pigment particles 22P are randomly distributed throughout the grid site. The pigment particles in the continuous tone embodiment do not form a solid opaque layer of print. The particles only partially cover the underlying carrier. Exposed carrier 22E reflects light from the spaces between the pigment particles.

The continuous tone embodiment has three components of reflected light energy from the input image as shown in FIG. 2C. The light source (shown in FIG. 4) provides light energy coming down from the upper left. The photo-detectors (also shown in FIG. 4) captures light energy reflected upwards and to the right.

1) A symbol foreground component 23F reflected from hand-entered symbol pigment 24F forming the symbol foreground feature.
2) A carrier background component 23B reflected from carrier 22C forming the carrier background feature. The carrier background component is light reflected from the large blank, unprinted areas of the carrier surface.
3) A grid background component reflected from continuous tone grid background feature, which includes two sub-components:
   3a) A grid pigment sub-component 23P of minimal light energy reflected from particles 22P of grid pigment within the grid sites; and
   3b) A grid carrier sub-component 23E of maximal light energy reflected from exposed carrier 22E included within the grid sites.

The grids have sufficient pigment with sufficient reflection in the visible spectrum, to be visible to the user as a distinct color in ambient light. However, the grids have insufficient pigment to form foreground pixels along with the foreground feature when detected by the photo-detectors during the scanning. The minimal energy contributed by the grid pigment may be limited to a few spectral lines (or even a single line). Exposed carrier sub-component 23E has too much reflected light energy under scanning illumination to form foreground pixels when detected by the photo-detectors. The maximal energy contributed by exposed sub-component 23E may be as much as the entire spectral content of the illumination light source. This abundant light energy causes exposed sub-component 23E to form background pixels. Thus, the entire grid background feature is detected as background pixels along with the carrier background component feature. The constraint grids become "hidden" in the background pixels enhancing the signal-to-noise ratio of the pixel foreground to the pixel background.

SIGNAL-TO-NOISE RATIO—(FIG. 2D)

The symbol foreground feature formed by low reflective dark text is signal in OCR classifying applications. The carrier background feature formed by the highly reflective white paper is wide spectrum noise. The signal-to-noise ratio is generally elevated because of the wide separation between symbol foreground component 23F of reflected light (low) relative to the carrier background component 23B (high). The grid background feature, while not signal, is unfortunately not completely white. The grid background feature is more reflective than the symbol foreground signal, and less reflective than the carrier background noise. The grid background component of reflected light is somewhere between the low symbol foreground component 23F and the high carrier background component 23B, and has the potential for being detected as signal causing an erosion of the signal-to-noise ratio.

The signal-to-noise ratio may be enhanced by reducing the pigment content of the constraint grids which increases the reflectivity of the grids providing a higher exposed carrier sub-component 23E. Generally, the more light reflected from the constraint grids the higher will be the signal to noise ratio. Reducing the pigment makes the grids look more like noise background and less like signal foreground. The grid pigment may be reduced by employing grid printing ink having a low concentration of pigment during the printing of the constraint grids. This diluted ink is lighter in color and provides constraint grids with pigment particles further apart which appear fainter to the user. The effect of low pigment printing inks is shown graphically in FIG. 2D, which is a plot of reflected light energy (vertical) against pigment concentration (horizontal). As the pigment concentration decreases (right to left), grid pigment sub-component 23P (bold lower curve) also decreases. The constant (flat) portion of the pigment curve at the right represents pigment concentrations so high that 100% of the constraint grid is covered by pigment forming an opaque layer over the carrier. The pigment sub-component remains constant at this high plateau as the pigment concentration decreases, until the carrier becomes exposed between the thinning pigment particles. In contrast, exposed carrier sub-component 23E (light upper curve) increases as the pigment concentration decreases due to the expanding carrier exposure. At zero pigment, pigment sub-component 23P drops to zero, and exposed carrier sub-component 23E increase to the maximum value because the constraint grid is 100% exposed carrier. Within a suitable working range 22W of pigment concentrations, the pigment particles are sufficiently visible to the user in ambient lighting, while carrier sub-component 23E is high enough to be detected as background under scanning illumination. That is, the exposed grid carrier is almost as reflective as the background carrier, and the continuous tone grid feature passes as background along with the carrier feature. The constraint grids merge into the background enhancing the signal-to-noise.

Alternatively, the total grid pigment content of the constraint grids maybe reduced by minimizing the physical area occupied by the grid sites. Thinner (or dashed) grid lines require less ink to print and therefore contain less pigment resulting in an enhanced signal-to-noise ratio.

Occulting Constraint Grids

Figure 5C:
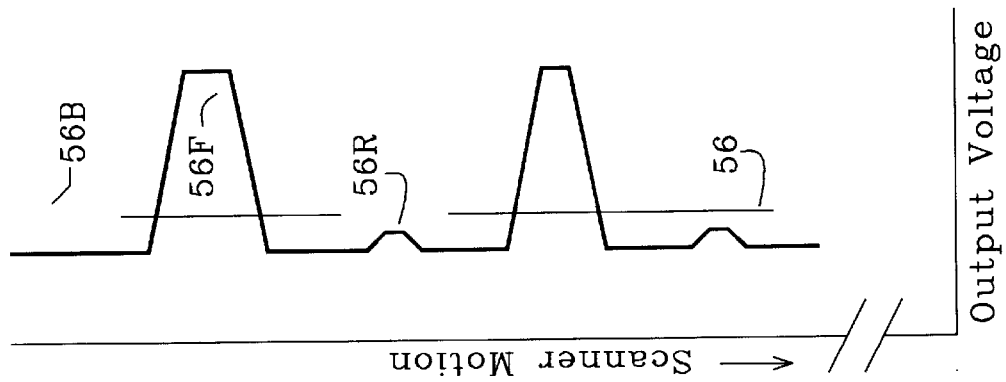
FIG. 5C is a time chart of the scanner output voltage during the scanning of FIG. 5A symbol.
Figure 5B:
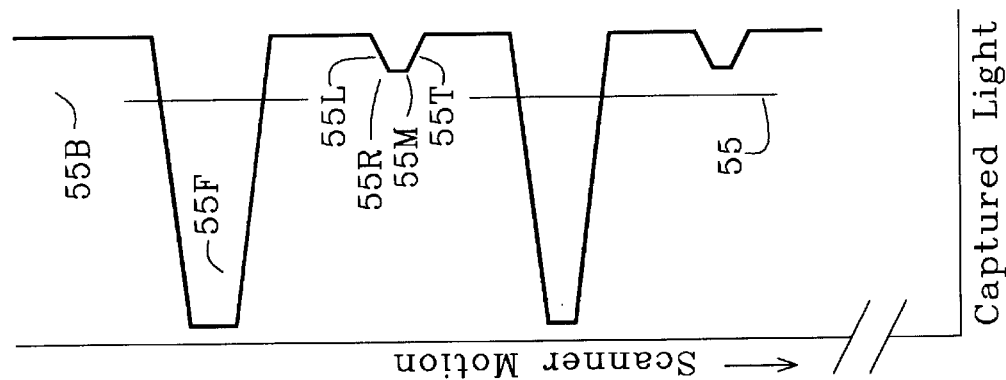
FIG. 5B is a time chart of the components of reflected light during the scanning of the FIG. 5A symbol.
Figure 5A:
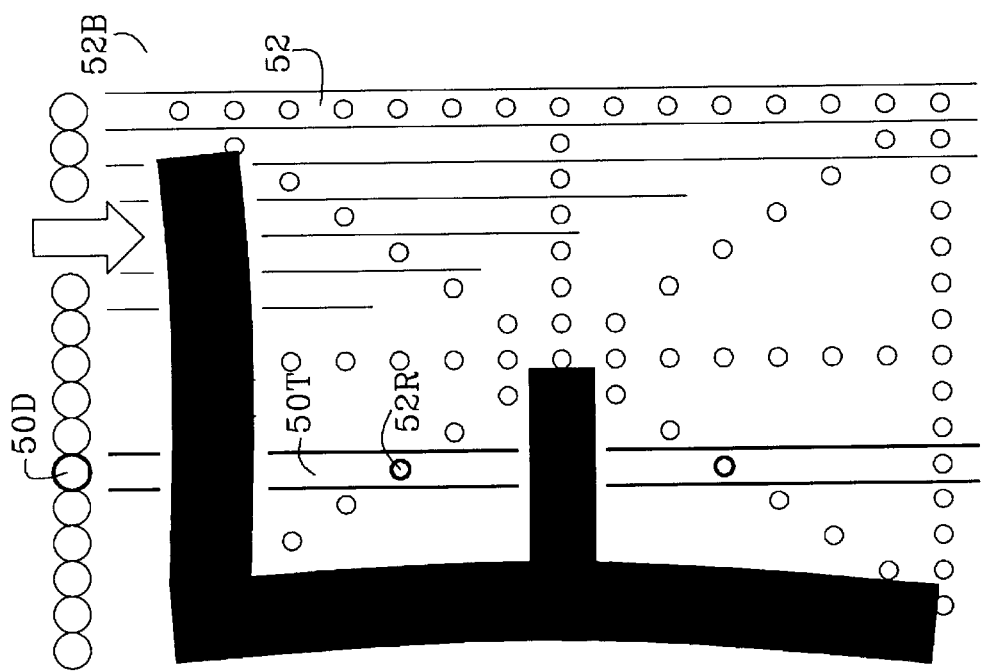
FIG. 5A is a diagram showing the scanning of an input symbol "F" entered into a halftone constraint grid.

The signal-to-noise may be further enhanced by placing the strokes of the hand-entered symbols on top of the grid sites as shown by symbol pigment 24F in FIG. 2C. The strokes are entered into the constraint grids by depositing symbol pigment 24F, directly over the grid pigment 22P forming that portion of the constraint grids. A portion of the constraint grid is thereby covered by the deposited symbol pigment, as shown in FIG. 5A by the input symbol "F" entered into constraint grid 52. The deposited symbol pigment may be opaque to the illumination light source, completely occulting the grid pigment thereunder during scanning. The amount of deposit coverage is dependent on the size and complexity of the hand-entered symbol. A simple input symbol such as the character "i" with only one stroke covers only a minor portion of the constraint grid. Input symbol "F" of FIG. 5A with many strokes covers about half of the constraint grid. A complex symbol such as the number "8" covers almost the entire constraint grid. This coverage reduces the amount of grid pigment available for illumination which decreases grid pigment sub-component 23P of reflected light enhancing the signal-to-noise.

PARTIAL TONE GRID—(FIG. 3A 3B 3C)

The constraint grids of the background feature may be partial tone (halftone) printed within the grid sites. Partial tone printing commonly employed in newspaper photographs is made up of myriads of tiny pigment dots such as spaced grid pigment regions 32R (see FIG. 3A). Partial tone printing is referred to as halftone, which is not literally accurate. The halftone printing dots usually cover less than half of the paper, but may cover more than half or exactly half. Bare grid interstitial regions 32I extend between halftone regions 32R as illustrated by grid fragment 32F shown in FIG. 3A. Halftone grid fragment 32F depicts the small piece of constraint grid 12 proximate node 12N of FIG. 1B. The halftone grid regions 32R are formed by continuous tone pigment particles and may be any shape. Regions 32R may be systematically arranged within the constraint grid as illustrated by the regular row/column configuration of FIG. 3A. Alternatively, the pigment regions may be randomly positioned to minimize visual texture within the constraint grid. The halftone interstitial regions 32I are bare input carrier within the grid sites surrounding the spaced halftone regions. An magnified view of a single pigment region 32M (shown in FIG. 3B) reveals that individual halftone pigment particles 32P are randomly distributed throughout the pigment regions just like continuous tone pigment particles 22P of FIG. 2B. The pigment particles do not completely cover the underlying carrier, and light is reflected from exposed underlying carrier 32U between the pigment particles.

The halftone embodiment has three components of reflected light energy as shown in FIG. 3C.

1) A symbol foreground component 33F reflected from hand-entered symbol pigment 34F forming the symbol foreground feature.
2) A carrier background component 33B reflected from carrier 32C forming the background feature.
3) A grid background component reflected from halftone grid background feature, which includes three sub-components:
    3a) A grid pigment sub-component 33P of minimal light energy reflected from particles 32P of grid pigment within the grid sites; and
    3b) An underlying carrier sub-component 33U having maximal light energy reflected from exposed underlying carrier 32U included within the grid sites under the halftone pigment particles.
    3c) An interstitial carrier sub-component 33I having maximal light energy reflected from interstitial regions 32I of bare input carrier between spaced grid regions 32R.

Exposed carrier sub-component 23E of the continuous tone embodiment has expanded into underlying carrier sub-component 33U and interstitial carrier sub-component 33I of the halftone embodiment. The combined reflected light energy of underlying and interstitial sub-components is sufficient to form background pixels when detected by the photo-detectors during the scanning step. The pigment within the pigment regions may be highly concentrated and completely cover the underlying carrier to produce an opaque grid region. In such a case the underlying sub-component is zero, and only the interstitial sub-component is available for detection.

Single Ink Supply

The low pigment printing ink techniques of the continuous tone embodiment may be employed in the halftone embodiment with similar results. In addition, in the halftone embodiment the pigment on the carrier and grid interstitial carrier sub-component 33I may be altered without changing the supply reservoir of printing ink. Interstitial sub-component 33I of reflected light energy provided during the illuminating step may be increased (or decreased) by three primary techniques.

1) increasing (or decreasing) the spacing between adjacent grid pigment regions,
2) decreasing (or increasing) the size of the grid pigment regions, and
3) decreasing (or increasing) the population density of the grid pigment regions, (see FIG. 3D).

Each of these three techniques involves only halftone printing parameters, and does not involve the pigment concentration in the supply of grid printing ink. Therefore, only a single reservoir of printing ink is required for altering halftone printing.

PRINTING CELLS—PIGMENT LEVELS—(FIG. 3D)

The constraint grids may be formed by a repeating pattern or matrix of printing cells, such as the 3×3 cells shown in FIG. 3A. Each cell contains a predetermined number of grid pigment regions 32R systematically arranged within the cell, such as for example the 3×3 arrangement of nine pigment regions. Pigment sub-component 33P and underlying sub-component 33U within each printing cell are directly dependent on the number of grid pigment regions contained within each cell. In contrast interstitial carrier sub-component 33I is inversely dependent by the number of grid pigment regions. The interstitial sub-component may be incremented (or decremented) in levels by decrementing (or incrementing) the number of grid pigment regions contained within each cell.

This stepping effect is shown graphically in FIG. 3D, which is a plot of reflected light energy (vertical) against pigment concentration (horizontal). As the number of pigment regions decrements from nine to zero (right to left), pigment sub-component 33P (bold lower curve) decrements in steps or levels. Suitable systematic arrangements within printing cells having less than nine grid regions, are shown for levels 1, 3, 5, and 7, just above the corresponding level in grid pigment curve 33P. In contrast, interstitial sub-component 33I (light upper curve) increments in steps as the number of pigment regions decrements. This increase in interstitial light energy is due to the incrementing interstitial carrier exposure caused by the loss of pigment regions. At zero halftone pigment regions, the level of grid pigment sub-component 33P is zero, and the level of interstitial sub-component 33I is maximum because the constraint grid is 100% exposed carrier. At a suitable working level, such as level 32W (two grid regions within each printing cell), the constraint grids are sufficiently visible to the user and the interstitial carrier sub-component is high enough to be detected as background. That is, the collective reflectivity of the bare interstitial carrier is almost as reflective as the background carrier, and the halftone grid feature passes as background along with the carrier feature.

Grid Region Size

In one embodiment, the grid pigment regions may be tiny dots too small to be individually discernable to the naked eye of the user. These small grid regions cause the pigment regions to appear as constraint grids of solid color to the user. Further, the small regions reduce the reflectivity of the partial tone grid pigment within the grid sites, with a corresponding increase in the interstitial carrier reflection. Thus, the grid pigment sub-component is decreased and the grid interstitial carrier sub-component is increased, further enhancing the signal-to-noise.

In a converse embodiment, the spacing between adjacent grid pigment regions may be too narrow to permit the interstitial regions of exposed carrier to be discernable to the user, causing the pigment regions to appear solid. These narrow interstitial regions result in a more uniform distribution of grid pigment throughout the halftone grid sites further enhancing the signal-to-noise ratio.

BRIGHTENING AGENTS—(FIG. 4)

A suitable light source such as wide spectrum lamp 40L provides the incident light energy which is reflected from carrier 42C and from grid pigment particles 42P contained within halftone regions 42R. The reflected light then passes through an anti-aliasing defocusing lens 40A, and is captured by photo-detector 40D. The constraint grid print may include a wide reflection spectrum ingredient such as a brightening agent, in addition to the narrow spectrum grid pigment. The brightening agent ingredient increases the light energy reflected from the constraint grid to promote detection as background. The narrow spectrum pigment ingredient promotes visibility to the user. The brightening agent may be any suitably reflective material such as tiny particles of white pigment or specular metal (or both). Aluminum particles have highly reflective facets with no light absorption or diffusion. The facets function as miniature speculums (mirrors) distributed throughout the grid regions. The brightening agent has a higher reflectivity than the carrier background feature and increases the grid background component of reflected light energy relative to the symbol foreground component. The surface of ordinary paper has a reflectivity of about 70–90%, while a silvered mirror surface has a reflectivity of about 97%. The reflective brightening agent compensates the grid sites for the presence of low reflective grid pigment, raising the underlying carrier sub-component and the interstitial carrier sub-component to a higher value comparable to the carrier background component. This additional background light energy from the constraint grid further enhances the signal-to-noise ratio.

The brightening agent may be in the form of grid substrate 42B printed at the grid site underneath grid pigment regions 42R. The constraint grids of FIG. 4 are printed in two steps, first in continuous tone with a substrate printing ink containing the brightening agent, and second in halftone with the grid printing ink. The substrate may be a solid layer of brightening agent, such a thin film of white pigment or metal. The brightening agent may be a particulate additive suspended in the substrate printing ink. Alternatively, the printing may a single step, with the brightening agent suspended directly in the grid printing ink to provide a pigment region having brightening particles 32B along with pigment particles 32P as shown in FIG. 3B.

APERTURE EFFECT—(FIG. 5A 5B 5C)

During the scanning step, an aperture effect between the halftone dots and the light capturing apertures of the photo-detectors causes a loss of resolution in the pixel image of the halftone dots. The input symbol "F" in FIG. 5A has been formed within constraint grid 52 by three hand entered black strokes. The resulting imperfect foreground symbol is shown being scanned by a photo-diode array from the top downward along a plurality of parallel detector tracks. FIG. 5B is a scan motion chart showing the high/low sequence of light reflected from the F symbol along a single detector track 50T (bold) after capture by aperture 50D (bold) of a single detector. FIG. 5C shows the corresponding low/high sequence of output voltages from detector aperture 50D for single track 50T, caused by changes in bulk conductivity within the detector in response to the captured light. The maximal captured light from blank background area 52B just above the top horizontal stroke of the "F" causes initial high light intensity 55B and low output background voltage 56B. The minimal captured light from the top horizontal stroke causes low light intensity 55F, and high output foreground voltage 56F. The near maximal captured light from halftone pigment region 52R (bold) in the diagonal below the top stroke, causes near high light intensity 55R and near low output voltage 56R. The halftone pigment dots of constraint grid 52 reflect slightly less light than the blank carrier of the background feature. Dot 52R therefore produce slightly less bulk conductivity within the photo-diodes, causing a slightly higher output voltage.

The relative scanning motion (indicated by the arrow) between constraint grid 52 and the photo-detector array causes transient overlaps of grid pigment dot 52R and detector aperture 50D which produce leading down-ramps and tailing up-ramps in near maximal light intensity 55R. Similar leading up-ramps and tailing down-ramps are associated with minimal background light intensity 55F caused by overlaps between the top stroke and detector aperture 50D. Leading ramp-down phase 55L occurs at the start of the overlap between pigment dot 52R and detector aperture 50D. Tailing ramp-up phase 55T occurs at the termination of the overlap. Middle phase 55M occurs during the complete overlap between pigment dot 52R and detector aperture 50D after the ramp-down phase and before the ramp-up phase. The length of the three phases together is the diameter "D" of the aperture plus the diameter "d" of grid dot 52R. In the embodiment of FIG. 5A, D is equal to about 2d. The length of just middle phase 55M is the diameter "D" of the aperture minus the diameter "d" of grid dot 52R. This aperture effect causes a loss of resolution of all the halftone dots along the direction of relative scanning motion. The interfaces between the pigment dots and the adjacent interstitial regions become blurred along the leading and tailing edges for a distance of one diameter "d".

INCREASED APERTURE EFFECT—(FIG. 6A 6B 6C)

Figure 6C:
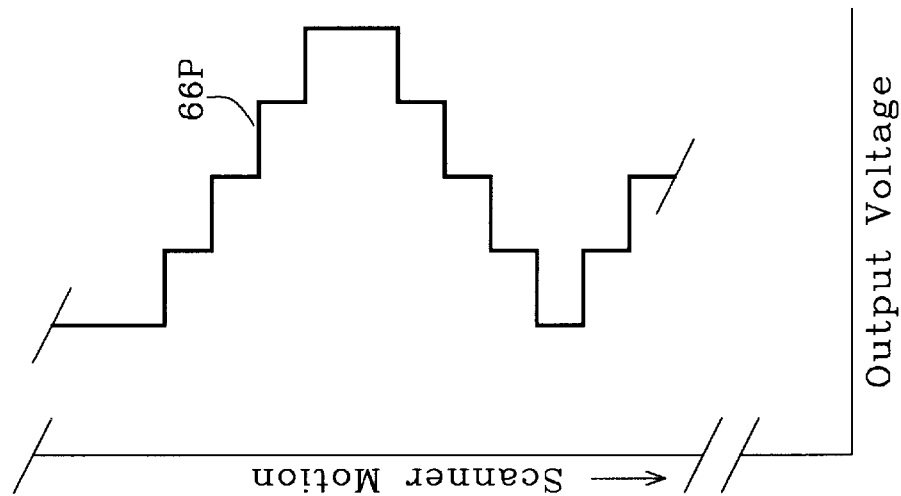
FIG. 6C is a time chart of the scanner output voltage during the scanning of the FIG. 6A grid dots.
Figure 6B:
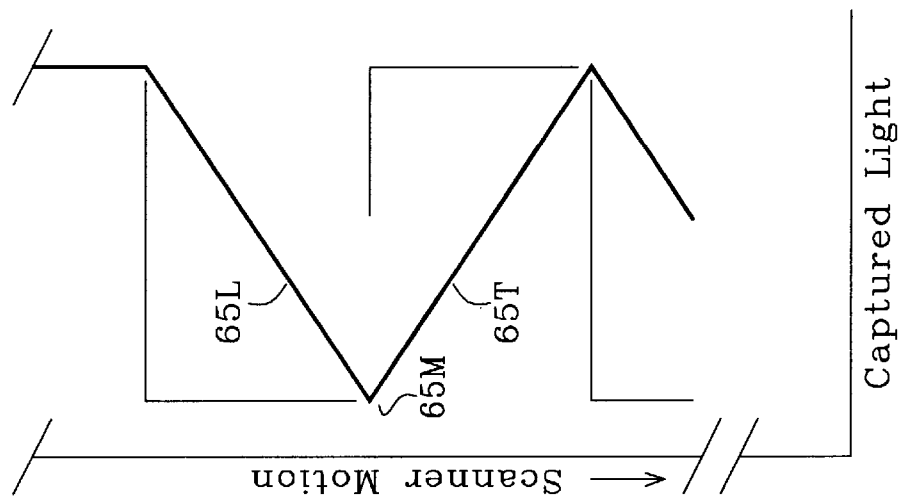
FIG. 6B is a time chart of the grid components of reflected light during the scanning of the FIG. 5A grid dots.
Figure 6A:
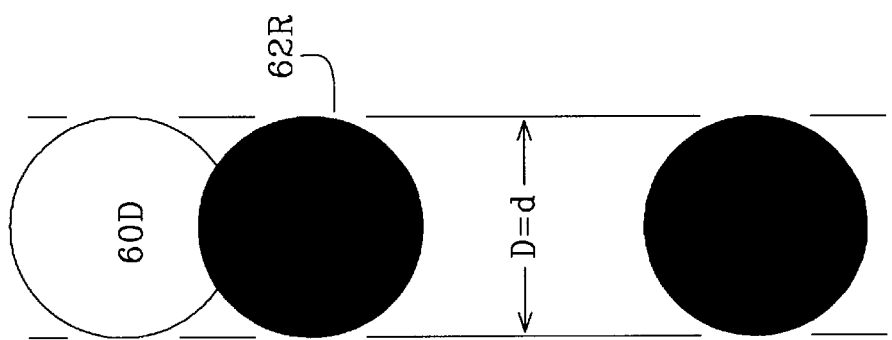
FIG. 6A is a diagram showing scanning with grid dots about the same diameter as the photo-diode aperture.

The greatest resolution blur and most enhancement of the signal-to-noise ratio occurs when the detector apertures are generally the same size as pigment dots. In FIG. 6A detector aperture 60D has a diameter "D" which the same as the diameter "d" of pigment dot 62R. That is, D=d. FIG. 6B shows the ramps (bold lines) in the captured light intensities produced by the aperture effect of pigment dot 62R. The middle phase aperture effect 65M is minimal, because the down-ramp terminates just as the up-ramp starts as shown in FIG. 6B. The grid pigment sub-component is formed mostly of a leading down 65L and a tailing up ramp 65T. The length of the two ramps is D+d=2D. The ideal case for captured light (without the aperture effect) is shown in light lines in FIG. 6B for comparison to the ramps of the aperture effected intensities. The light ramps of FIG. 6B form corresponding pixel voltage steps 66P in the output voltage of FIG. 6C.

The signal to noise-to-noise ratio is enhanced for the ramp case because most of the ramp is distant from the threshold level, and therefore has a low probability of being detected as foreground. The portion of the ramp which is closest to the threshold is only point 65M with zero width. In the ideal case, the portion of the light intensity which is closest to the threshold has width D, with a higher probability of being detected as foreground.

The FIG. 5 constraint grid is shown as a single string of widely spaced round dots for illustration purposes. Actually the halftone regions may be close together, have non-round shapes, and be many dots across forming a broad grid. A constraint grid broader than the stroke may define for the user the area in which the symbol pigment must be deposited. The diameter D of the aperture and the diameter d of the dots may vary depending on the application. In the D=2d embodiment of FIG. 5, D may be about 400 dpi (dots per inch) and d may be about 800 dpi. Dot densities greater than about 300 dpi are considered to small to be seen by the naked eye. The D=d embodiment of FIG. 6 both D and d may be about 100 dpi. The aperture effect in continuous tone constraint grids (such as shown in FIG. 2A) appears only along the borders between the foreground feature, the background feature, and the constraint grids. Continuous tone grids do not have pigment dots with carrier/pigment edges.

STEPS OF METHOD—(FIG. 7)

A method of enhancing the signal-to-noise ratio between the foreground (signal) and background (noise) in an output pixel image of a user hand entry, to facilitate OCR processing is shown in FIG. 7. This method includes the following basic steps.

Providing an input carrier sheet with hand-entry constraint grids printed thereon for receiving the strokes of the user hand entry.

Entering the strokes of the hand-entered symbols into the constraint grids. The symbol pigment establishes the symbol foreground feature of the input image against the carrier and grid background features.

Illuminating the input image carried on the input carrier with a wide spectrum light source to provide three components of reflected light energy.

1) A symbol foreground component having minimal light energy reflected from the symbol foreground feature of the input image,
2) A carrier background component having maximal light energy reflected from the carrier background feature of the input image, and
3) A grid background component having maximal light energy reflected from the grid background feature of the input image. The grid background component of reflected light energy further having
   3a) a pigment sub-component of minimal light energy reflected from particles of grid pigment within the grid sites, and
   3b) a carrier sub-component of maximal light energy reflected from that portion of the input carrier included within the grid sites, During the illuminating step, the light source may emit strong emissions within the narrow reflection spectrum of the grid pigment. This selected emission increases the reflected light energy in the grid pigment sub-component further enhancing the signal-to-noise ratio. In one embodiment, the narrow reflection spectrum of the grid pigment is red, and the photo-detectors are silicon diodes responsive to the pigment red. In a red-yellow-blue color system, the red pigment may be a simple pigment formed by the primary red color. In a cyan-yellow-magenta color system, the red pigment may be a composite pigment formed by a mixture of yellow and magenta.

Scanning the illuminated input image with an array of bulk conductive photo-detectors having a wide response spectrum to obtain an electronic output pixel image of the hand-entered symbols. The pixel image has foreground pixels and background pixels. The image of each hand-entered symbol is defined by foreground pixels contrasted against background pixels. The photo-detectors capture light energy reflected from the input image to provide the pixel image of the input image. The bulk conductivity of the detectors varies during the formation of each pixel in response to the total energy of the captured reflected light. Background pixels are produced by the maximal energy of the carrier background component plus the grid background component, and foreground pixels are produced by the minimal energy to the symbol foreground component.

Classifying the electronic pixel image of the hand-entered foreground symbols by OCR processing against the stroke pattern library.

The method of FIG. 7 may include the following additional steps.

Storing the pixel image of the input image including a transition ground feature created by the symbol pigment. This storing step occurs after the scanning step and prior to the classifying step. During the step of hand entering the strokes of the input symbol, the symbol pigment creates a symbol transition ground feature of the input image around each stroke of the symbol foreground feature. The transition ground feature is a form of greyscale, and provides a symbol transition ground component of varying light energy reflected from the transition ground feature during the illuminating step. The transition ground component varies between the maximal light energy reflected from the carrier background component and the minimal light energy reflected from the symbol foreground component.

Retrieving the stored pixel image after the storing step and prior to the classifying step. The retrieved pixel image includes the transition ground and other greyscale.

Filtering out the Grid background feature in the retrieved pixel image about a threshold between the symbol foreground and grid background. The filtering clamps the grid background pixels and the carrier background pixels within the same background digital value (or range of values), further enhancing the signal-to-noise ratio. A suitable voltage threshold 56 is shown in FIG. 5C. The voltage threshold is just above the near low output voltage 56R in order to limit the clamping to the lower voltages. Most of the transition ground and other greyscale are above the threshold and are preserved in the pixel image. Voltage threshold 56 corresponds to a captured light threshold 55 shown in FIG. 5B. A suitable light threshold 35 shown in FIG. 3D is between the second and third light level. Pigment levels of either zero, one, or two produce an interstitial sub-component 33I above light threshold 35 causing grid regions 32R to be clamped with carrier background component 33B. Another suitable light threshold 25 shown in FIG. 2D is just below the working range of light energy.

Defocusing the components of reflected light energy after the illuminating step but prior to the scanning step. A suitable defocusing device, such as anti-aliasing lens 40A shown in FIG. 4, causes a loss of resolution of the edge interface between the pigment regions and the interstitial regions. The defocusing causes a loss of resolution in all directions between the grid pigment sub-component with the interstitial carrier sub-component. As a result, the grid pigment sub-component more uniformly distributed among the pixels forming the edge interfaces, further enhancing the signal-to-noise ratio.

CONCLUSION

It will be apparent to those skilled in the art that the objects of this invention have been achieved as described hereinbefore.

Clearly various changes may be made in the structure and embodiments shown herein without departing from the concept of the invention. For example many of the features disclosed in connection with the halftone embodiments may be employed in the continuous tone embodiments. Conversely, many of the features of the continuous tone embodiments may be employed in the halftone embodiments. Further, features of the embodiments shown in the various figures may be employed with the embodiments of the other figures.

Therefore, the scope of the invention is to be determined by the terminology of the following claims and the legal equivalents thereof.

I claim as my invention:

1. A method of enhancing the signal-to-noise ratio between the foreground and background in a pixel image of strokes of a user hand entry, to facilitate OCR processing of the pixel image, comprising the steps of:

providing an input carrier having a wide reflection spectrum which establishes a carrier background feature of an input image, with hand-entry constraint grids printed thereon for receiving the strokes of the user hand entry, the constraint grids establish a grid background feature of the input image;

the constraint grids are printed in a grid pigment having a narrow reflection spectrum which is visible to the user as a distinct color against the carrier background feature for defining sites of the constraint grids to the user;

entering the strokes of hand-entered input symbols into the constraint grids in a symbol pigment having a wide absorption spectrum, which establishes a symbol foreground feature of the input image against the background features;

illuminating the input image carried on the input carrier with a wide spectrum light source to provide components of reflected light energy including a symbol foreground component having minimal light energy reflected from the symbol foreground feature of the input image, a carrier background component having maximal light energy reflected from the carrier background feature of the input image, and a grid background component having maximal light energy reflected from the grid background feature of the input image;

scanning the illuminated input image with an array of bulk conductive photo-detectors having a wide response spectrum for capturing light energy reflected from the input image to provide a pixel image of the input image, the bulk conductivity of each detector varying during the formation of each pixel in response to the total energy of the captured reflected light, the pixel image formed having background pixels caused by the maximal energy of the carrier background component plus the grid background component, and foreground pixels caused by the minimal energy to the symbol foreground component, the grid background component of reflected light energy further having a pigment sub-component of minimal light energy reflected from particles of grid pigment within the grid sites, and a carrier sub-component of maximal light energy reflected from that portion of the input carrier included within the grid sites, the grids having sufficient pigment to be visible to the user, but insufficient pigment to form foreground pixels when detected by the photo-detectors during the scanning step, the grid carrier sub-component having so much reflected light energy that it is unable to form foreground pixels when detected by the photo-detectors during the scanning step, but having sufficient light energy to form background pixels when detected by the photo-detectors during the scanning step, thereby causing the entire grid background feature to be detected as background pixels along with the carrier background feature enhancing the signal-to-noise ratio of the pixel foreground to the pixel background; and classifying the foreground pixel image of the hand-entered input symbol by OCR processing.

2. The method of claim 1, wherein: the constraint grids are formed by pigment particles printed in continuous tone within the grid sites.

3. The method of claim 2, wherein the grid carrier sub-component of light energy is reflected from exposed input carrier included within the grid sites under the continuous tone pigment particles.

4. The method of claim 1, wherein: the constraint grids are formed by pigment particles printed in partial tone within the grid sites, having spaced regions of partial tone grid pigment with interstitial regions of bare input carrier within the grid sites between the spaced grid pigment regions defining edge interfaces between the interstitial regions and the pigment regions.

5. The method of claim 4, wherein the grid carrier sub-component of light energy further comprises:

an interstitial sub-component having maximal light energy reflected from the interstitial regions of bare input carrier; and an underlying sub-component having maximal light energy reflected from exposed input carrier included within the grid sites under the partial tone pigment particles;

the interstitial carrier sub-component in combination with the underlying carrier sub-component having sufficient light energy to form background pixels when detected by the photo-detectors during the scanning step.

6. The method of claim 5, wherein: the grid pigment regions are too small to be individually discernable to the user, which causes the pigment regions to appear as constraint grids of solid color to the user, and which reduces the partial tone grid pigment within the grid sites decreasing the grid pigment sub-component and increasing the interstitial carrier sub-component further enhancing the signal-to-noise ratio.

7. The method of claim 5, wherein: the spacing between adjacent grid pigment regions is too narrow to permit the interstitial regions of exposed carrier to be discernable to the user, which causes the pigment regions to appear as constraint grids of solid color to the user, and which distributes the partial tone grid pigment more uniformly throughout the grid sites further enhancing the signal-to-noise ratio.

8. The method of claim 5, wherein the interstitial carrier sub-component of reflected light energy provided during the illuminating step may be increased or decreased by increasing or decreasing the spacing between adjacent grid pigment regions.

9. The method of claim 5, wherein the interstitial carrier sub-component of reflected light energy provided during the illuminating step may be increased or decreased by decreasing or increasing the size of the grid pigment regions.

10. The method of claim 5, wherein the interstitial carrier sub-component of reflected light energy provided during the illuminating step may be increased or decreased by decreasing or increasing the population density of the grid pigment regions.

11. The method of claim 5, wherein the constraint grids are formed by a repeating pattern of printing cells, each cell containing a predetermined number of grid pigment regions systematically arranged within each cell.

12. The method of claim 11, wherein the interstitial carrier sub-component of each printing cell is determined by the number of grid pigment regions contained within each cell, and the carrier interstitial sub-component may be incremented or decremented in levels by decrementing or incrementing the number of grid pigment regions contained within each cell.

13. The method of claim 5, further comprising, after the illuminating step but prior to the scanning step, the additional step of:

defocusing the components of reflected light energy causing a loss of resolution of the edge interface between the pigment regions and the interstitial regions, which partially merges the grid pigment sub-component with the interstitial carrier sub-component to distribute the grid pigment sub-component more uniformly among the pixels forming the edge interface further enhancing the signal-to-noise ratio.

14. The method of claim 5, wherein during the scanning step relative scanning motion between the grid pigment regions and light capturing apertures on the photo-detectors provides:

an overlap between each pigment region and the apertures;

a leading ramp phase aperture effect in the grid pigment sub-component captured by the apertures at the start of the overlap between each pigment region and the apertures;

a tailing ramp phase aperture effect in the grid pigment sub-component captured by the apertures at the termination of the overlap between each pigment region and the apertures; and a middle phase aperture effect in the grid pigment sub-component captured by the apertures during the overlap between each pigment region and the apertures after the leading ramp phase and before the tailing ramp phase;

which aperture effects cause a loss of resolution along the direction of relative scanning motion of the leading edge interface and tailing edge interface between the pigment regions and the interstitial regions, which partially merges the grid pigment sub-component with the interstitial carrier sub-component to distribute the grid pigment sub-component more uniformly among the pixels forming the edge interface further enhancing the signal-to-noise ratio.

15. The method of claim 14, wherein: the detector apertures are generally the same size as the pigment regions, and the middle phase aperture effect is minimal further enhancing the signal-to-noise ratio.

16. The method of claim 1, wherein during the step of entering the strokes of the hand entry, the symbol pigment creates a symbol transition ground feature of the input image at least partially around at least some of the strokes of the symbol foreground feature, which provides a symbol transition ground component of varying light energy reflected from the transition ground feature during the illuminating step, which varies between the maximal light energy reflected from the carrier background component and the minimal light energy reflected from the symbol foreground component.

17. The method of claim 16, wherein after the scanning step and prior to the classifying step, comprising the additional step of:

storing the pixel image of the input image including the transition ground created by the symbol pigment.

18. The method of claim 17, wherein after the storing step and prior to the classifying step, the additional steps of:

retrieving the stored pixel image; and filtering out the grid background feature in the retrieved pixel image about a threshold between the foreground and transition ground for clamping the transition ground pixels with the background pixels at the same binary level further enhancing the signal-to-noise ratio.

19. The method of claim 1, wherein during the illuminating step:

the light source emits strong emissions within the narrow reflection spectrum of the grid pigment to increase the reflected light energy in the grid pigment sub-component further enhancing the signal-to-noise ratio.

20. The method of claim 19, wherein the narrow reflection spectrum of the grid pigment is red, and the photo-detectors are silicon diodes responsive to the red.

21. The method of claim 1, wherein during the entering step:

the strokes of the input symbols are entered into the constraint grids by depositing the symbol pigment, directly over the grid pigment forming the constraint grids, reducing the amount of grid pigment available for illumination which decreases the grid pigment sub-component further enhancing the signal-to-noise ratio.

22. The method of claim 20, wherein the deposited symbol pigment is opaque to the illumination light source, and occults the grid pigment thereunder.

23. The method of claim 1, wherein during the entering step:

the breadth of each constraint grid defines the area to receive the symbol pigment for the user.

24. The method of claim 1, wherein the constraint grids are printed in a wide reflection spectrum brightening agent in addition to the narrow reflection spectrum grid pigment, which brightening agent has a higher reflectivity than the carrier background feature for increasing the grid background component reflected light energy relative to the symbol foreground component, further enhancing the signal-to-noise ratio.

25. The method of claim 24, wherein the brightening agent is a particulate additive suspended in printing ink for the grid pigment.

26. The method of claim 25, wherein the brightening agent additive is white pigment particles.

27. The method of claim 25, wherein the brightening agent additive is specular metal particles.

28. The method of claim 24, wherein the brightening agent is contained in a grid site substrate printed underneath the grid pigment.

29. The method of claim 28, wherein the brightening agent contained in the substrate is white pigment particles.

30. The method of claim 28, wherein the brightening agent contained in the substrate is specular metal particles.

31. The method of claim 28, wherein the brightening agent contained in the substrate is a thin film of reflective material.

32. A method of enhancing the signal-to-noise ratio between foreground pixels and background pixels in a pixel image of strokes of a user hand entry, to facilitate OCR processing of the pixel image, comprising the steps of:

illuminating an input image carried on an input carrier with a wide spectrum light source, which input carrier has a wide reflection spectrum producing a carrier background feature and carries constraint grids for hand entering the strokes of symbols in a symbol pigment having a wide absorption spectrum producing a symbol foreground feature, the constraint grids printed in a grid pigment having a narrow reflection spectrum which is visible to the user as a distinct color against the carrier background feature for defining sites of the constraint grids to the user, the illuminating providing components of reflected light energy including a symbol foreground component having minimal light energy reflected from the symbol foreground feature of the input image established by the symbol pigment, a carrier background component having maximal light energy reflected from the carrier background feature of the input image established by the input carrier, and a grid background component having maximal light energy reflected from the grid background feature of the input image established by the grid pigment;

scanning the illuminated input image with an array of bulk conductive photo-detectors having a wide response spectrum for capturing light energy reflected from the input image to provide a pixel image of the input image, the bulk conductivity of each detector varying during the formation of each pixel in response to the total energy of the captured reflected light, the pixel image formed having background pixels caused by the maximal energy of the carrier background component plus the grid background component, and foreground pixels caused by the minimal energy of the symbol foreground component, the grid background component of reflected light energy further having a pigment sub-component of minimal light energy reflected from particles of grid pigment within the grid sites, and a carrier sub-component of maximal light energy reflected from that portion of the input carrier included within the grid sites, the grids having sufficient pigment to be visible to the user, but insufficient pigment to form foreground pixels when detected by the photo-detectors during the scanning step, the grid carrier sub-component having so much reflected light energy that it is unable to form foreground pixels when detected by the photo-detectors during the scanning step, but having sufficient light energy to form background pixels when detected by the photo-detectors during the scanning step, thereby causing the entire grid background feature to be detected as background pixels along with the carrier background feature enhancing the signal-to-noise ratio of the pixel foreground to the pixel background; and classifying the foreground pixel image of the hand-entered input symbol by OCR processing.

33. A computer readable medium containing a computer program for enhancing the signal to-noise ratio between foreground pixels and background pixels in a pixel image of strokes of a user hand entry, to facilitate OCR processing of the pixel image, comprising the steps of:

illuminating an input image carried on an input carrier with a wide spectrum light source, which input carrier has a wide reflection spectrum producing a carrier background feature and carries constraint grids for hand entering the strokes of symbols in a symbol pigment having a wide absorption spectrum producing a symbol foreground feature, the constraint grids printed in a grid pigment having a narrow reflection spectrum which is visible to the user as a distinct color against the carrier background feature for defining sites of the constraint grids to the user, the illuminating providing components of reflected light energy including a symbol foreground component having minimal light energy reflected from the symbol foreground feature of the input image established by the symbol pigment, a carrier background component having maximal light energy reflected from the carrier background feature of the input image established by the input carrier, and a grid background component having maximal light energy reflected from the grid background feature of the input image established by the grid pigment;

scanning the illuminated input image with an array of bulk conductive photo-detectors having a wide response spectrum for capturing light energy reflected from the input image to provide a pixel image of the input image, the bulk conductivity of each detector varying during the formation of each pixel in response to the total energy of the captured reflected light, the pixel image formed having background pixels caused by the maximal energy of the carrier background component plus the grid background component, and foreground pixels caused by the minimal energy of the symbol foreground component, the grid background component of reflected light energy further having a pigment sub-component of minimal light energy reflected from particles of grid pigment within the grid sites, and a carrier sub-component of maximal light energy reflected from that portion of the input carrier included within the grid sites, the grids having sufficient pigment to be visible to the user, but insufficient pigment to form foreground pixels when detected by the photo-detectors during the scanning step, the grid carrier sub-component having so much reflected light energy that it is unable to form foreground pixels when detected by the photo-detectors during the scanning step, but having sufficient light energy to form background pixels when detected by the photo-detectors during the scanning step, thereby causing the entire grid background feature to be detected as background pixels along with the carrier background feature enhancing the signal-to-noise ratio of the pixel foreground to the pixel background; and classifying the foreground pixel image of the hand-entered input symbol by OCR processing.

34. Apparatus for enhancing the signal-to-noise ratio between foreground pixels and background pixels in a pixel image of strokes of a user hand entry, to facilitate OCR processing of the pixel image, comprising:

means for illuminating an input image carried on an input carrier with a wide spectrum light source, which input carrier has a wide reflection spectrum producing a carrier background feature and carries constraint grids for hand entering the strokes of symbols in a symbol pigment having a wide absorption spectrum producing a symbol foreground feature, the constraint grids printed in a grid pigment having a narrow reflection spectrum which is visible to the user as a distinct color against the carrier background feature for defining sites of the constraint grids to the user, the illuminating providing components of reflected light energy including a symbol foreground component having minimal light energy reflected from the symbol foreground feature of the input image established by the symbol pigment, a carrier background component having maximal light energy reflected from the carrier background feature of the input image established by the input carrier, and a grid background component having maximal light energy reflected from the grid background feature of the input image established by the grid pigment;

means for scanning the illuminated input image with an array of bulk conductive photo-detectors having a wide response spectrum for capturing light energy reflected from the input image to provide a pixel image of the input image, the bulk conductivity of each detector varying during the formation of each pixel in response to the total energy of the captured reflected light, the pixel image formed having background pixels caused by the maximal energy of the carrier background component plus the grid background component, and foreground pixels caused by the minimal energy of the symbol foreground component, the grid background component of reflected light energy further having a pigment sub-component of minimal light energy reflected from particles of grid pigment within the grid sites, and a carrier sub-component of maximal light energy reflected from that portion of the input carrier included within the grid sites, the grids having sufficient pigment to be visible to the user, but insufficient pigment to form foreground pixels when detected by the photo-detectors during the scanning, the grid carrier sub-component having so much reflected light energy that it is unable to form foreground pixels when detected by the photo-detectors during the scanning, but having sufficient light energy to form background pixels when detected by the photo-detectors during the scanning, thereby causing the entire grid background feature to be detected as background pixels along with the carrier background feature enhancing the signal-to-noise ratio of the pixel foreground to the pixel background; and means for classifying the foreground pixel image of the hand-entered input symbol by OCR processing.

* * * * *